United States Patent
Goto et al.

(10) Patent No.: US 12,483,308 B2
(45) Date of Patent: Nov. 25, 2025

(54) ANTENNA DIRECTION DETERMINING METHOD, WIRELESS COMMUNICATION SYSTEM AND COMMUNICATION DEVICE

(71) Applicant: NTT, Inc., Tokyo (JP)

(72) Inventors: Daisuke Goto, Musashino (JP); Kiyohiko Itokawa, Musashino (JP); Yasuyoshi Kojima, Musashino (JP); Fumihiro Yamashita, Musashino (JP)

(73) Assignee: NTT, Inc., Tokyo (JP)

( * ) Notice: Subject to any disclaimer, the term of this patent is extended or adjusted under 35 U.S.C. 154(b) by 362 days.

(21) Appl. No.: 17/927,043

(22) PCT Filed: Jun. 12, 2020

(86) PCT No.: PCT/JP2020/023231
§ 371 (c)(1),
(2) Date: Nov. 22, 2022

(87) PCT Pub. No.: WO2021/250894
PCT Pub. Date: Dec. 16, 2021

(65) Prior Publication Data
US 2023/0223998 A1    Jul. 13, 2023

(51) Int. Cl.
*H04B 7/06* (2006.01)
*H04B 7/195* (2006.01)

(52) U.S. Cl.
CPC ........... *H04B 7/0608* (2013.01); *H04B 7/195* (2013.01)

(58) Field of Classification Search
CPC .................................................. H04B 7/0608
See application file for complete search history.

(56) References Cited

U.S. PATENT DOCUMENTS

| | | | | |
|---|---|---|---|---|
| 6,026,579 A | * | 2/2000 | Autrey | H01Q 1/125 33/431 |
| 6,297,780 B1 | | 10/2001 | Kirisawa | |
| 2011/0021166 A1 | * | 1/2011 | Walley | H01Q 3/24 455/272 |
| 2015/0188647 A1 | * | 7/2015 | Wang | G01R 35/005 455/67.12 |

FOREIGN PATENT DOCUMENTS

| | | |
|---|---|---|
| JP | H11-308160 A | 11/1999 |
| JP | 2018537012 A | 12/2018 |
| JP | 2019-007874 A | 1/2019 |
| WO | WO-2017/053096 A1 | 3/2017 |

OTHER PUBLICATIONS

Naoto Kadowaki et al., "Recent Trends of Satellite Communication Technologies Applied to New Frontiers", IEICE Transactions on Information and Systems B, vol. J97-B No. 11, p. 979-991, 2014.
Arif Hidayat et al., "LEO antenna ground station analysis using fast fourier transform", 2017 7th International Annual Engineering Seminar (InAES). IEEE, 2017.

* cited by examiner

*Primary Examiner* — Hsinchun Liao
(74) *Attorney, Agent, or Firm* — Harness, Dickey & Pierce, P.L.C.

(57) ABSTRACT

An antenna orientation deciding method in a wireless communication system that has a communication device provided with an antenna having directionality and a relay device that travels, includes a deciding step of deciding an orientation at which the directionality of the antenna as to the relay device is optimal, on the basis of position information of the communication device, orbit information of the relay device, and information relating to orientation of directionality of the antenna.

6 Claims, 6 Drawing Sheets

ANTENNA DIRECTION DETERMINING METHOD, WIRELESS COMMUNICATION SYSTEM AND COMMUNICATION DEVICE

CROSS-REFERENCE TO RELATED APPLICATIONS

This application is a 371 U.S. National Phase of International Application No. PCT/JP2020/023231, filed on Jun. 12, 2020. The entire disclosure of the above application is incorporated herein by reference.

TECHNICAL FIELD

The present invention relates to an antenna direction determining method, a wireless communication system, and a communication device.

BACKGROUND ART

Advance in IoT (Internet of Things) technology has led to study regarding installing IoT terminals provided with various types of sensors in various types of places. For example, utilizing IoT terminals in order to collect data at locations where installing base stations is difficult, such as on buoys and vessels at sea, in mountainous regions, and so forth, is also being envisioned.

There also is proposed technology of performing wireless communication between IoT terminals and UAVs (un-manned aerial vehicles) or geostationary satellites (e.g., see NPL 1). NPL 1 discloses technology for nonregenerative relay relating to geostationary satellites. However, when installing a relay device in a low-orbit satellite or the like, the area in which the relay device is capable of communication travels as the low-orbit satellite travels. Accordingly, it is expected that the time in which communication devices of IoT terminals, base stations, and so forth installed on the Earth can communicate with the relay device will be limited.

Now, technology of tracking low-orbit satellites by antennas has been proposed (e.g., see NPL 2). Using the technology described in NPL 2 enables communication efficiency to be improved even in situations in which time that communication can be performed with low-orbit satellites is limited.

CITATION LIST

Non Patent Literature

[NPL 1] Naoto Kadowaki, et al, "Recent Trends of Satellite Communication Technologies Applied to New Frontiers", IEICE transactions B, Vol. J97-B No. 11, p. 979-991, 2014

[NPL 2] Hidayat, Arif, et al. "LEO antenna ground station analysis using fast fourier transform", 2017 7th International Annual Engineering Seminar (InAES). IEEE, 2017.

SUMMARY OF THE INVENTION

Technical Problem

However, the technology disclosed in NPL 2 requires constant communication with the low-orbit satellite, and accordingly is not suitable for terminals regarding which operating with conserved electric power is desired, such as IoT terminals. Further, the technology disclosed in NPL 2 assumes the antenna to be provided with a tracking mechanism, but some inexpensive terminals such as IoT terminals are not provided with a tracking mechanism. In this way, technology is awaited whereby efficient communication can be performed with a low-orbit satellite, even with an inexpensive IoT terminals that is not provided with a tracking mechanism.

In view of the foregoing, it is an object of the present invention to provide technology that enables efficient communication with a moving body that travels, even for inexpensive communication devices.

Means for Solving the Problem

An aspect of the present invention is an antenna orientation deciding method in a wireless communication system that has a communication device provided with an antenna having directionality and a relay device that travels. The antenna orientation deciding method includes a deciding step of deciding an orientation at which the directionality of the antenna as to the relay device is optimal, on the basis of position information of the communication device, orbit information of the relay device, and information relating to orientation of directionality of the antenna.

An aspect of the present invention is a wireless communication system that has a communication device provided with an antenna having directionality and a relay device that travels. The wireless communication system includes an antenna orientation deciding unit that decides an orientation at which the directionality of the antenna as to the relay device is optimal, on the basis of position information of the communication device, orbit information of the relay device, and information relating to orientation of directionality of the antenna.

An aspect of the present invention is a communication device in a wireless communication system that has the communication device provided with an antenna having directionality and a relay device that travels. The communication device includes an antenna orientation deciding unit that decides an orientation at which the directionality of the antenna as to the relay device is optimal, on the basis of position information of the communication device, orbit information of the relay device, and information relating to orientation of directionality of the antenna.

Effects of the Invention

According to the present invention, efficient communication can be performed with a moving body that travels, even with inexpensive communication devices.

DESCRIPTION OF EMBODIMENTS

An embodiment of the present invention will be described below with reference to the Figures.

First Embodiment

Figure 1:
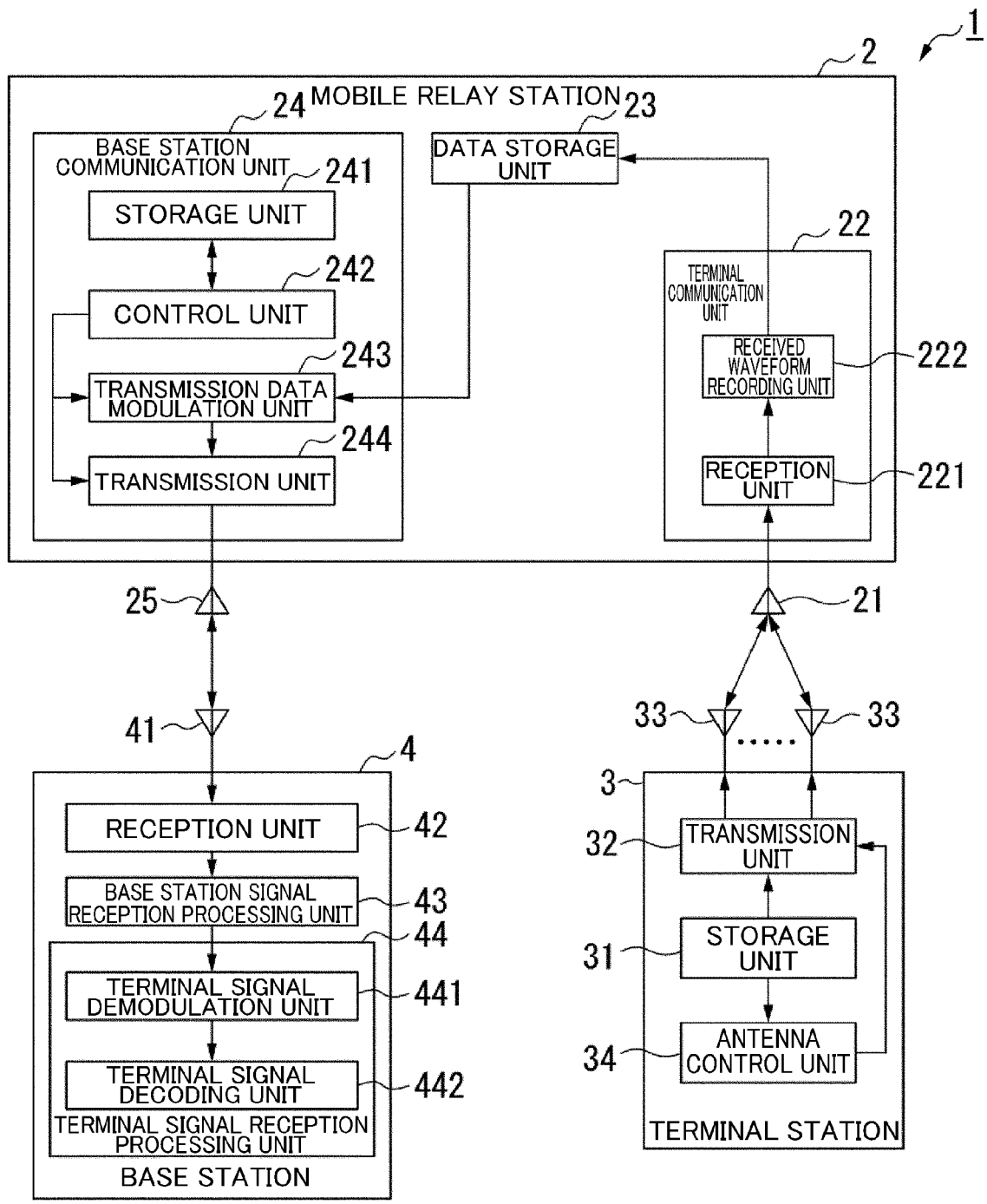
FIG. 1 is a configuration diagram of a wireless communication system according to a first embodiment.

FIG. 1 is a configuration diagram of a wireless communication system 1 according to a first embodiment.

The wireless communication system 1 includes a mobile relay station 2, a terminal station 3, and a base station 4. The number of each of the mobile relay stations 2, the terminal stations 3, and the base stations 4 included in the wireless communication system 1 is arbitrary. It is assumed that there are a large number of terminal stations 3.

The mobile relay station 2 is an example of a relay device mounted on a moving body, and an area in which the mobile relay station 2 can perform communication moves with the passage of time. The mobile relay station 2 is provided in, for example, a low Earth orbit (LEO) satellite. The altitude of the LEO satellite is 2000 km or less, and the LEO satellite orbits over the Earth in about 1.5 hours. While moving over the Earth, the mobile relay station 2 receives data transmitted from the terminal station 3, as a wireless signal. The mobile relay station 2 transmits the received data to the base station 4 by wireless. Hereinafter signals transmitted from the mobile relay station 2 to the base station 4 will be referred to as downlink signals.

The terminal station 3 collects data such as environmental data detected by a sensor and wirelessly transmits the data to the mobile relay station 2. The terminal station 3 is, for example, an IoT terminal. Hereinafter signal transmitted from the terminal station 3 to the mobile relay station 2 will be referred to as terminal uplink signal.

The base station 4 receives the data collected by the terminal station 3 from the mobile relay station 2.

The terminal station 3 according to the first embodiment is installed at specific positions on the Earth, which also is a location where rocking does not occur, such as flatland, mountain region, or the like. The term location where rocking does not occur as used here is a location where rocking does not occur due to movement by a moving body, movement of the terminal station 3, waves on the sea, or the like. The base station 4 according to the first embodiment is installed at a particular location on the Earth, such as on land, at sea, or the like.

It is conceivable to use a relay device mounted on an unmanned aerial vehicle such as a geostationary satellite, a drone or a high altitude platform station (HAPS) as a mobile relay station. However, in the case of a relay station mounted on a geostationary satellite, the coverage area (footprint) on the ground is wide, but a link budget for IoT terminals installed on the ground is considerably small due to a high altitude. On the other hand, in the case of a relay station mounted on a drone or a HAPS, the link budget is high, but the coverage area is narrow.

Furthermore, drones require batteries and HAPS require solar panels. According to the first embodiment, the mobile relay station 2 is mounted on a LEO satellite. Therefore, in addition to keeping the link budget within a limit, the LEO satellite has no air resistance and consumes less fuel because it orbits outside the atmosphere. In addition, the footprint is also large as compared to the case where a relay station is mounted on a drone or a HAPS.

The mobile relay station 2 installed in the LEO satellite performs communication while traveling at high speeds, and accordingly the amount of time in which each terminal station 3 and base station 4 can communicate with the mobile relay station 2 is limited. Specifically, as viewed from on the ground, the mobile relay station 2 passes overhead in around ten minutes. Terminals provided with conventional tracking mechanisms would be capable of tracking the mobile relay station 2 traveling at high speeds and efficiently communicating even within the limited amount of time. However, the terminal station 3 according to the first embodiment is not provided with a tracking mechanism. Accordingly, in the first embodiment, the terminal station 3 is provided with a plurality of directional antennas, and performs communication at a timing at which communication can be performed with the mobile relay station 2.

The timing at which communication can be performed with the mobile relay station 2 is the timing at which the mobile relay station 2 is situated within the range of the beamwidth of the directional antenna. Whether or not the mobile relay station 2 is situated within the range of the beamwidth of the directional antenna is determined on the basis of orbit information of the LEO satellite in which the mobile relay station 2 is installed, position information of the terminal station 3, and the orientation of the directional antenna. The orbit information of the LEO is information whereby the position, speed, direction of travel, and so forth, of the LEO satellite at a given clock time, can be obtained. For example, orbit information of the LEO may include position information indicating at what the LEO satellite will be situated at what clock time, in advance. Accordingly, at what timing the LEO satellite will be situated within the range of the beamwidth of which directional antenna can be comprehended. The terminal station 3 transmits data at a timing in which communication can be performed with the mobile relay station 2.

The configuration of each device will be described.

The mobile relay station 2 includes an antenna 21, a terminal communication unit 22, a data storage unit 23, a base station communication unit 24, and an antenna 25.

The terminal communication unit 22 includes a reception unit 221 and a received waveform recording unit 222. The reception unit 221 receives terminal uplink signals by the antenna 21.

The received waveform recording unit 222 performs sampling of the received waveforms of the terminal uplink signals that the reception unit 221 has received. The received waveform recording unit 222 generates waveform data indicating values obtained by sampling. The received waveform recording unit 222 writes the reception waveform information in which is set the reception clock time of receiving the terminal uplink signals at the antenna 21 and the generated waveform data to the data storage unit 23.

The data storage unit 23 stores the received waveform information written thereto by the received waveform recording unit 222.

The base station communication unit 24 transmits the received waveform information to the base station 4 by base station downlink signals according to an optional wireless communication format. The base station communication unit 24 is provided with a storage unit 241, a control unit 242, a transmission data modulation unit 243, and a transmission unit 244. The storage unit 241 stores a transmission start timing calculated in advance on the basis of the orbit information of the LEO satellite in which the mobile relay station 2 is installed, and the location of the base station 4.

The control unit 242 controls the transmission data modulation unit 243 and the transmission unit 244 to transmit the received waveform information to the base station 4 at the transmission start timing stored in the storage unit 241.

The transmission data modulation unit 243 modulates the received waveform information stored in the data storage unit 23 and generates base station downlink signals.

The transmission unit 244 converts the base station downlink signals from electric signals into wireless signals, and performs transmission thereof from the antenna 25.

The terminal station 3 is provided with a storage unit 31, a transmission unit 32, a plurality of antennas 33, and an antenna control unit 34.

The storage unit 31 stores position information (position information of own device) of the terminal station 3, antenna information, orbit information of the LEO satellite, sensor data, and so forth. Antenna information is information relating to the antennas 33. For example, the antenna information represents information of the orientation (e.g., angle) in which each of the antennas 33 is facing. The position information of the terminal station 3, antenna information, and orbit information of the LEO satellite are to have been registered beforehand prior to the terminal station 3 starting operations. In a case in which there is a plurality of mobile relay stations 2, orbit information of all of the LEO satellites is stored in the storage unit 31.

The transmission unit 32 reads the sensor data from the storage unit 31 as terminal transmission data. The transmission unit 32 wirelessly transmits terminal uplink signals, in which is set the terminal transmission data that has been read out, by the antennas 33 decided by the antenna control unit 34.

The plurality of antennas 33 are directional antennas that each have directionality in a particular direction. The plurality of antennas 33 are installed facing in different orientations from each other. The term different orientations from each other here includes meanings from the orientations being even slightly different (for example, the antenna orientations are even 1° different) to the orientations being greatly different (for example, the antenna orientations are 180° different).

The transmission unit 32 transmits a signal according to, for example, Low Power Wide Area (LPWA). Although the LPWA includes LoRaWAN (registered trademark), Sigfox (registered trademark), Long Term Evolution for Machines (LTE-M), Narrow Band (NB)-IoT, and the like, any wireless communication method can be used. The transmission unit 32 may perform transmission with other terminal stations 3 by time-division multiplexing, orthogonal frequency division multiplexing (OFDM), and so forth.

The transmission unit 32 decides the channel and transmission timing to be used by itself for transmission of the terminal uplink signals, by a method decided in advance in the wireless communication format to be used. Also, the transmission unit may perform beamforming of signals to be transmitted from the plurality of antennas 33, in accordance with a method decided in advance in the wireless communication format that is to be used.

The antenna control unit 34 determines whether the current timing is a timing at which communication can be performed with the mobile relay station 2, on the basis of the orbit information of the LEO satellite, the position information of the terminal station 3, and the antenna information.

In a case of determining that the current timing is a timing at which communication can be performed with the mobile relay station 2, the antenna control unit 34 causes data to be transmitted by antennas 33 capable of communicating with the mobile relay station 2.

The base station 4 is provided with an antenna 41, a reception unit 42, a base station signal reception processing unit 43, and a terminal signal reception processing unit 44.

The reception unit 42 converts base station downlink signals received by the antenna 41 into electrical signals.

The base station signal reception processing unit 43 performs demodulation and decoding of received signals that the reception unit 42 has converted into electric signals, thereby obtaining received waveform information. The base station signal reception processing unit 43 outputs the received waveform information to the terminal signal reception processing unit 44.

The terminal signal reception processing unit 44 performs reception processing of terminal uplink signals indicated by the received waveform information. At this time, the terminal signal reception processing unit 44 obtains terminal transmission data by performing reception processing by the wireless communication format used by the terminal station 3 for transmission. The terminal signal reception processing unit 44 is provided with a terminal signal demodulation unit 441 and a terminal signal decoding unit 442.

The terminal signal demodulation unit 441 demodulates waveform data, and outputs symbols obtained by the demodulation to the terminal signal decoding unit 442. The terminal signal demodulation unit 441 may perform demodulation on the signals indicated by the waveform data, after performing processing in which terminal uplink signals received by the antenna 21 of the mobile relay station 2 undergo Doppler shift compensation. The Doppler shift that the terminal uplink signals received by the antenna 21 are subjected to is calculated in advance on the basis of the position of the terminal station 3, and the orbit information of the LEO in which the mobile relay station 2 is installed.

The terminal signal decoding unit 442 decodes the symbols demodulated by the terminal signal demodulation unit 441, thereby obtaining the terminal transmission data transmitted from the terminal station 3.

Figure 2:
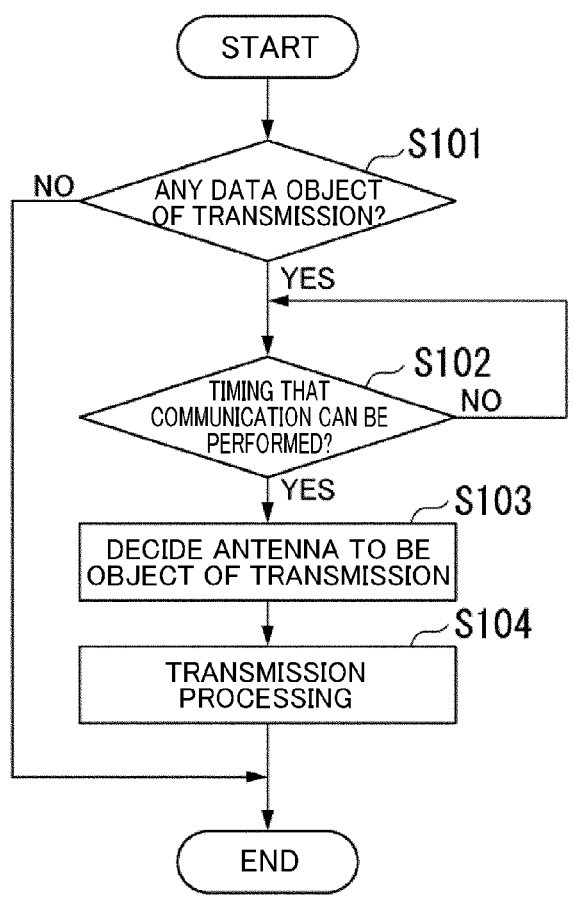
FIG. 2 is a flowchart showing a flow of data transmission processing that a terminal station performs in the first embodiment.

FIG. 2 is a flowchart showing the flow of data transmission processing that the terminal station 3 according to the first embodiment performs. The processing in FIG. 2 may be executed periodically, or may be executed from a timing at which the mobile relay station 2 comes to a position near to the terminal station 3.

In a case that which position the mobile relay station 2 will come to at which clock time is known in advance, the terminal station 3 can judge the timing at which the mobile relay station 2 will come to a position near to the terminal station 3. For example, if information indicating at which position the mobile relay station 2 will be situated at which clock time is included in the orbit information, the terminal station 3 can judge at which clock time the mobile relay station 2 will be situated in the sky above the own device, and so forth. Then again, even in a case in which the clock time and position to which the mobile relay station 2 will come is not known in advance, the terminal station 3 can judge at which time the mobile relay station 2 will be situated in the sky above the own device, on the basis of information of the position, speed, and direction of travel of the LEO satellite.

The antenna control unit 34 references the storage unit 31 and determines whether or not there is data that is the object of transmission (step S101). In a case in which there is no data that is the object of transmission (step S101—NO), the terminal station 3 ends the processing of FIG. 2.

Conversely, in a case in which there is data that is the object of transmission (step S101—YES), the antenna control unit 34 determines whether or not the current timing is a timing at which communication can be performed, on the basis of the orbit information of the LEO satellite, position information of the terminal station 3, and antenna information (step S102).

Specifically, the antenna control unit 34 first estimates the position of the mobile relay station 2 at a point of time for determining whether or not the current timing is a timing at which communication can be performed, on the basis of orbit information of the LEO satellite. Next, the antenna control unit 34 uses the antenna information stored in the storage unit 31 and the position information of the terminal station 3 to determine whether or not there is an antenna 33 oriented toward the position of the mobile relay station 2 that has been estimated.

To be oriented toward the position of the mobile relay station 2 means to have directionality toward the position of the mobile relay station 2. That means to be oriented such that directionality toward the mobile relay station 2 is optimal. An orientation in which directionality toward the mobile relay station is optimal means an orientation (angle) at which the visibility time of the mobile relay station is greatest.

In a case in which there is no antenna 33 oriented toward the position of the mobile relay station 2, the antenna control unit 34 determines that the current timing is not a timing at which communication can be performed.

Conversely, in a case in which there is an antenna 33 oriented toward the position of the mobile relay station 2, the antenna control unit 34 determines that the current timing is a timing at which communication can be performed.

In a case of determining that the current timing is not a timing at which communication can be performed (step S102—NO), the antenna control unit 34 repeats the processing until a timing at which communication can be performed arrives.

Conversely, in a case in which the current timing is a timing at which communication can be performed (step S102—YES), the antenna control unit 34 decides the antenna 33 that is to be the object of transmitting data (step S103). Specifically, the antenna control unit 34 decides the antenna 33 orientated toward the position of the mobile relay station 2 to be the antenna 33 that is to be the object of transmitting data. Thus, the antenna control unit 34 decides the orientation in which the decided antenna 33 is facing to be the orientation at which directionality as to the mobile relay station is optimal.

The antenna control unit 34 outputs an instruction to the transmission unit 32 to transmit data from the antenna 33 that has been decided. The transmission unit 32 reads sensor data from the storage unit 31 as terminal transmission data. The transmission unit 32 wirelessly transmits terminal uplink signals in which the read terminal transmission data is set from the antenna 33 decided by the antenna control unit 34 (step S104).

According to the wireless communication system 1 configured in this way, the antenna 33 that is capable of communicating with the mobile relay station 2 is decided on the basis of position information of the terminal station 3, the orientation of each antenna 33, and orbit information. That is to say, an antenna 33, oriented such that directionality toward the mobile relay station 2 is optimal, is decided upon. The terminal station 3 then transmits terminal uplink signals including data to the mobile relay station 2, using the antennas 33 that has been decided upon. Thus, the terminal station 3 transmits the terminal uplink signals at a timing of the mobile relay station 2 entering a range in which communication can be performed, using the antenna 33 having directionality oriented toward the position of the mobile relay station 2. Accordingly, communication with the mobile relay station 2 does not have to be constantly performed as with conventional arrangements. Further, the antenna does not have to be provided with a tracking mechanism. Thus, even inexpensive IoT terminals can efficiently perform communication.

Modification of First Embodiment

Although a configuration has been described in the above embodiment in which a plurality of antennas 33 are used, an antenna which can perform beamforming in an optional direction may be used, using a phased array antenna or the like.

In the above embodiment, the terminal station 3 transmits a plurality of pieces of sensor data in a single time of transmission processing. The terminal station 3 may divide and transmit the sensor data stored in the storage unit 31. With such a configuration, the terminal station 3 performs transmission of sensor data by a certain antenna 33 (e.g., a first antenna 33) in the first time of transmission processing. Thereafter, the mobile relay station 2 travels as time passes, as well. Accordingly, there are cases in which the mobile relay station 2 is not situated within the range of the beamwidth of the first antenna 33 used in the first time of transmission processing.

The terminal station 3 estimates the position of the mobile relay station 2 after traveling in the second time of transmission processing, in the same way, and determines whether or not there is an antenna 33 oriented toward the position of the mobile relay station 2 that has been estimated. If there is there is an antenna 33 oriented toward the position of the mobile relay station 2, the antenna control unit 34 decides the antenna 33 oriented toward the position of the mobile relay station 2 to be the antenna 33 that is the object of transmitting data. The mobile relay station 2 is moving, and accordingly the antenna 33 decided here may be a different antenna 33 (e.g., a second antenna 33) from the first antenna 33 decided in the first time of transmission processing. In this case, the terminal station 3 performs transmission of sensor data using the second antenna 33. The plurality of antennas 33, which the terminal station 3 is provided with, each face in different orientations from each other. Accordingly, even when the second time of transmission processing is performed after elapse of a certain amount of time following the first time of transmission processing as described above, transmission processing can be performed by a different antenna 33. Thus, even inexpensive IoT terminals can efficiently perform communication with the mobile relay station 2.

Second Embodiment

In a second embodiment, usage of the terminal station in a situation of being installed at a location subjected to effects of rocking is assumed. A location subjected to effects of rocking is, for example, in a moving body such as an airplane, an onboard terminal, or the like, or a location subjected to the effects of rocking due to waves, such as on a buoy at sea, or the like.

Figure 3:
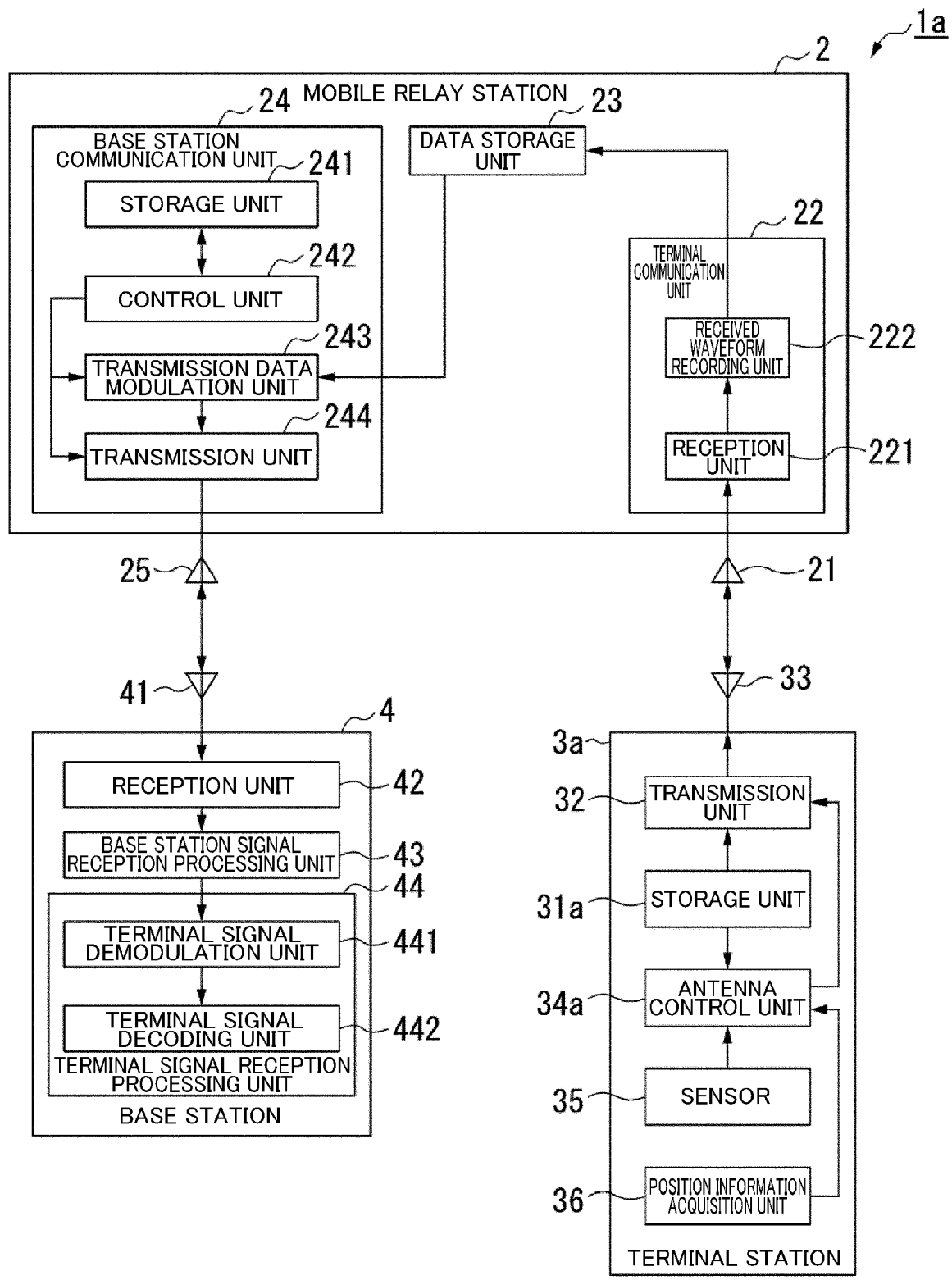
FIG. 3 is a configuration diagram of a wireless communication system according to a second embodiment.

FIG. 3 is a configuration of a wireless communication system 1a according to the second embodiment. In FIG. 3, configurations that are the same as those of the wireless communication system 1 in the first embodiment illustrated in FIG. 1 are denoted by the same signs, and description thereof will be omitted. The wireless communication system 1a has the mobile relay station 2, a terminal station 3a, and the base station 4.

The terminal station 3a is provided with a storage unit 31a, the transmission unit 32, one antenna 33, an antenna control unit 34a, a sensor 35, and a position information acquisition unit 36.

The storage unit 31a stores antenna information, orbit information of the LEO satellite, sensor data, and so forth. The storage unit 31a may store position information at each clock time that is acquired by the position information acquisition unit 36.

The sensor 35 is, for example, an acceleration sensor. The sensor 35 detects movement of the terminal station 3a. The sensor 35 may be a sensor other than an acceleration sensor, as long as movement of the terminal station 3a can be detected. The sensor 35 outputs information relating to movement of the terminal station 3a that is detected (hereinafter referred to as "movement information") to the antenna control unit 34a. The movement information includes information indicating how much the terminal station 3a is inclined as to the horizontal direction.

The position information acquisition unit 36 acquires position information of the terminal station 3a. For example, the position information acquisition unit 36 acquires position information of the terminal station 3a by a GPS (Global Positioning System) system.

The antenna control unit 34a determines whether or not the current timing is a timing at which communication can be performed with the mobile relay station 2, on the basis of the orbit information of the LEO satellite, the position information of the terminal station 3a, the antenna information, and the movement information. In a case of determining that the current timing is a timing at which communication can be performed with the mobile relay station 2, the antenna control unit 34 causes data to be transmitted by the antenna 33 capable of communicating with the mobile relay station 2.

Figure 4:
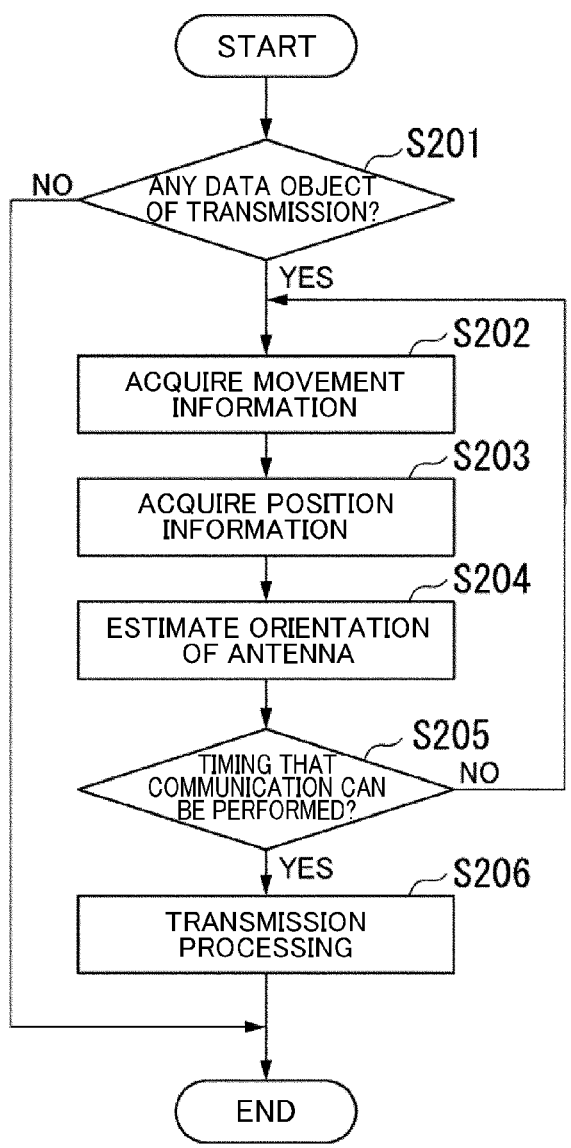
FIG. 4 is a flowchart showing a flow of data transmission processing that a terminal station performs in the second embodiment.

FIG. 4 is a flowchart showing the flow of data transmission processing that the terminal station 3a according to the second embodiment performs. The processing in FIG. 4 may be executed periodically, or may be executed from a timing at which the mobile relay station 2 comes to a position near to the terminal station 3a.

The antenna control unit 34a references the storage unit 31a and determines whether or not there is data that is the object of transmission (step S201). In a case in which there is no data that is the object of transmission (step S201—NO), the terminal station 3a ends the processing of FIG. 4.

Conversely, in a case in which there is data that is the object of transmission (step S201—YES), the antenna control unit 34a acquires the latest movement information (step S202). The antenna control unit 34a may instruct the sensor 35 to acquire movement information and thus acquire the latest movement information, or the antenna control unit 34a may acquire the movement information acquired most recently as the latest movement information.

The antenna control unit 34a acquires the latest position information (step S203). The antenna control unit 34a may instruct the position information acquisition unit 36 to acquire position information and thus acquire the latest position information, or the antenna control unit 34a may acquire the position information acquired most recently as the latest position information.

The antenna control unit 34a estimates the orientation of the antenna 33 on the basis of the acquired movement information and position information (step S204). Thereafter, the antenna control unit 34a determines whether or not the current timing is a timing at which communication can be performed, on the basis of the orbit information of the LEO satellite, position information of the terminal station 3a, and information of the orientation of the antennas 33 that has been estimated (step S205).

Specifically, the antenna control unit 34a first estimates the position of the mobile relay station 2 at a point of time for determining whether or not the current timing is a timing at which communication can be performed, on the basis of orbit information of the LEO satellite. Next, the antenna control unit 34a uses the position information of the terminal station 3a and the information of the orientation of the antenna 33 that has been determined to determine whether or not there is an antenna 33 oriented toward the position of the mobile relay station 2 that has been estimated.

In a case in which there is no antenna 33 oriented toward the position of the mobile relay station 2, the antenna control unit 34a determines that the current timing is not a timing at which communication can be performed.

Conversely, in a case in which there is an antenna 33 oriented toward the position of the mobile relay station 2, the antenna control unit 34a determines that the current timing is a timing at which communication can be performed.

In a case of determining that the current timing is not a timing at which communication can be performed (step S205-NO), the antenna control unit 34 repeats the processing of step S202 to step S204 until a timing at which communication can be performed arrives.

Conversely, in a case of determining that the current timing is a timing at which communication can be performed (step S205—YES), the antenna control unit 34a outputs an instruction to the transmission unit 32 to transmit data from the antenna 33 oriented toward the position of the mobile relay station 2. Thus, the antenna control unit 34a decides the orientation in which the decided antenna 33 is facing to be the orientation at which directionality as to the mobile relay station is optimal.

The transmission unit 32 reads sensor data from the storage unit 31 as terminal transmission data. The transmission unit 32 wirelessly transmits terminal uplink signals in which the read terminal transmission data is set from the antenna 33 (step S206).

According to the wireless communication system 1a configured in this way, the orientation in which the antenna 33 is facing is determined on the basis of position information of the terminal station 3a and movement information of the terminal station 3a. The terminal station 3a then determines whether or not the orientation in which the antenna 33 is facing is an orientation at which communication can be performed with the mobile relay station 2. In a case in which the orientation in which the antenna 33 is facing is an orientation at which communication can be performed with the mobile relay station 2, the terminal station 3a performs transmission of terminal uplink signals by the antenna 33 having the directionality in the orientation at which the mobile relay station 2 is situated. Thus, even in a situation of being installed and used at a location where there are effects of rocking, the terminal station 3a can perform communication with the mobile relay station 2. Also, communication with the mobile relay station 2 does not have to be continuously performed as with conventional arrangements. Further, the antenna does not have to be provided with a tracking mechanism. Thus, even inexpensive IoT terminals can efficiently perform communication with the mobile relay station 2.

Modification of Second Embodiment

Although a configuration has been described in the above embodiment in which one terminal station 3a is provided with a single antenna 33, one terminal station 3a may be provided with a plurality of antennas 33. In a case of such a configuration, the antenna control unit 34a determines whether or not there is an antenna 33 oriented toward the position of the mobile relay station 2, taking into consideration movement information when determining the timing at which communication can be performed in the first embodiment. Specifically, the antenna control unit 34a determines whether or not there is an antenna 33 oriented toward the position of the mobile relay station 2 that has been estimated, using the antenna information stored in the storage unit 31a, the position information of the terminal station 3a that has been acquired, and the movement information of the terminal station 3a that has been acquired. Subsequent processing is the same as with the first embodiment.

According to this configuration, the probability of being able to communicate with the mobile relay station 2 is improved over a case of being provided with the antenna 33. Accordingly, communication efficiency can be improved.

Third Embodiment

In a third embodiment, a configuration will be described in which communication efficiency is improved by outputting information for installing the terminal station facing an orientation at which directionality as to the mobile relay station is optimal.

Figure 5:
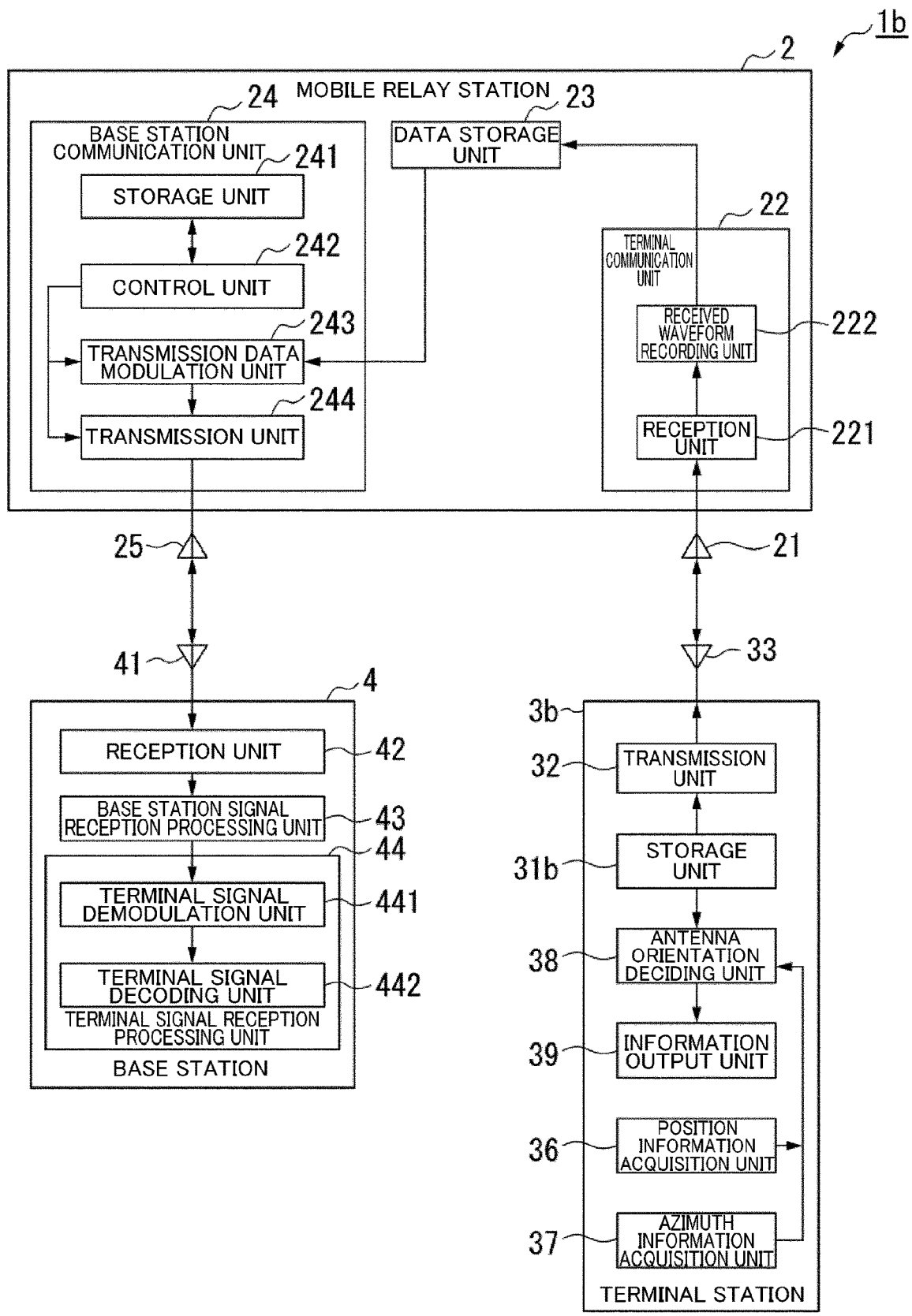
FIG. 5 is a configuration diagram of a wireless communication system according to a third embodiment.

FIG. 5 is a configuration of a wireless communication system 1b according to the third embodiment. In FIG. 5, configurations that are the same as those of the wireless communication system 1 in the first embodiment illustrated in FIG. 1 are denoted by the same signs, and description thereof will be omitted. The wireless communication system 1b has the mobile relay station 2, a terminal station 3b, and the base station 4.

The installation position of the terminal station 3b is decided before performing communication with the mobile relay station 2. Communication with the mobile relay station 2 is performed after installation position of the terminal station 3b is decided, and installed at the predetermined location. Data transmission processing in the third embodiment may be the same as in the first embodiment or the second embodiment.

Although not illustrated in FIG. 5, in a case of performing data transmission processing by the same method as in the first embodiment or the second embodiment, the terminal station 3b has the same configuration as with the first embodiment or the second embodiment, as well. In this case, the terminal station 3b has functions of an installation mode and a transmission mode. The installation mode is a mode for outputting information relating to installation of the terminal station 3b. The transmission mode is a mode of executing data transmission processing as in the first embodiment or the second embodiment. Switching can be performed between the installation mode and the transmission mode, by way of a button that is omitted from illustration. Description will be made below regarding a case in which the terminal station 3b is in the installation mode.

The terminal station 3b is provided with a storage unit 31b, the transmission unit 32, one antenna 33, the position information acquisition unit 36, an azimuth information acquisition unit 37, an antenna orientation deciding unit (antenna orientation decider) 38, and an information output unit 39.

The storage unit 31b stores orbit information of the LEO satellite, sensor data, and so forth. The storage unit 31b may store position information at each clock time that is acquired by the position information acquisition unit 36, and azimuth information at each clock time that is acquired by the azimuth information acquisition unit 37.

The position information acquisition unit 36 acquires position information of the terminal station 3b. For example, the position information acquisition unit 36 acquires position information of the terminal station 3b by a GPS system.

The azimuth information acquisition unit 37 acquires information of the orientation in which the antenna 33 of the terminal station 3b is facing. For example, the azimuth information acquisition unit 37 is an application of a compass function, or a magnetic compass. Azimuth information is information representing the bearing in which the antenna 33 is facing, for example.

The antenna orientation deciding unit 38 decides an orientation for the terminal station 3b, at which directionality as to the mobile relay station 2 is optimal, on the basis of the orbit information of the LEO satellite, the position information of the terminal station 3b, and the azimuth information. An orientation in which directionality toward the mobile relay station 2 is optimal is an orientation (angle) at which the visibility time of the mobile relay station 2 is greatest, as described earlier. Accordingly, the antenna orientation deciding unit 38 decides an orientation at which the visibility time of the mobile relay station 2 is greatest. Hereinafter, information relating to the orientation decided by the antenna orientation deciding unit 38 will be referred to as antenna orientation information.

The information output unit 39 outputs the antenna orientation information decided by the antenna orientation deciding unit 38. For example, the information output unit 39 may transmit the antenna orientation information to an external device by communication, or in a case in which the terminal station 3b is provided with a display device, display the antenna orientation information on the display device.

Figure 6:
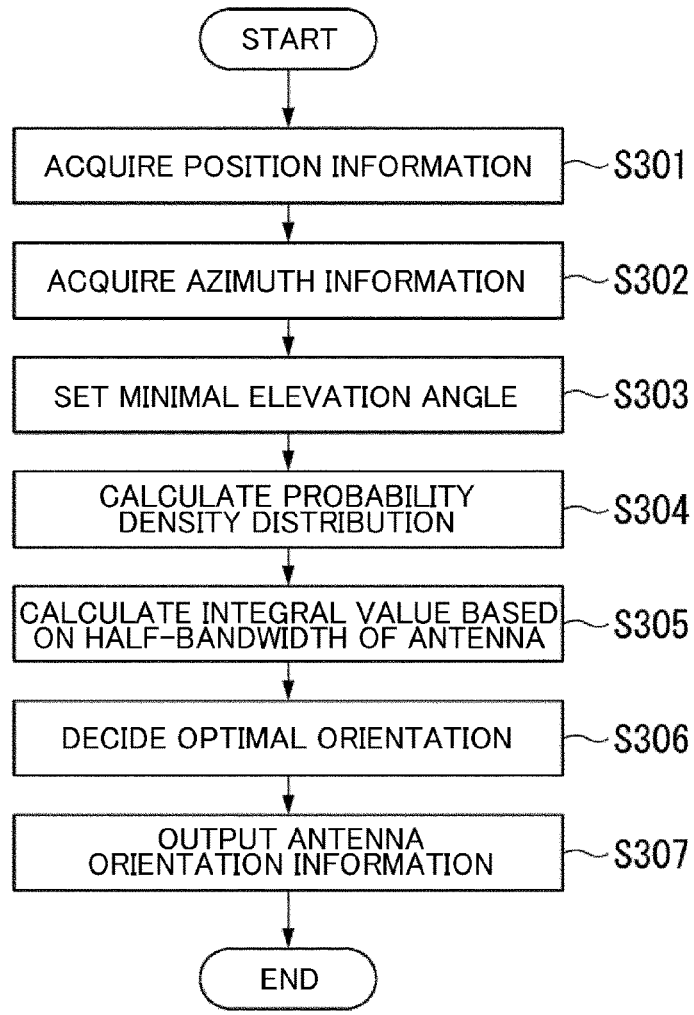
FIG. 6 is a flowchart showing a flow of antenna orientation information output processing that a terminal station performs in the third embodiment.

FIG. 6 is a flowchart showing the flow of antenna orientation information output processing that the terminal station 3b according to the third embodiment performs. The processing in FIG. 6 is executed at a timing instructed by the user when in installation mode.

The antenna orientation deciding unit 38 acquires the latest position information (step S301). The antenna orientation deciding unit 38 may instruct the position information acquisition unit 36 to acquire position information and thus acquire the latest position information, or the antenna orientation deciding unit 38 may acquire the position information acquired most recently as the latest position information.

The antenna orientation deciding unit 38 acquires the latest azimuth information (step S302). The antenna orientation deciding unit 38 may instruct the azimuth information acquisition unit 37 to acquire movement information and thus acquire the latest azimuth information, or the antenna orientation deciding unit 38 may acquire the azimuth information acquired most recently as the latest azimuth information.

The antenna orientation deciding unit 38 sets the minimum elevation angle that the terminal station 3b can receive signals from the mobile relay station 2 in a line of sight environment, on the basis of the latest position information and the latest azimuth information that are acquired, and the orbit information of the LEO satellite (step S303). An angle at which communication can be performed may be detected by the antenna orientation deciding unit 38 for the minimum elevation angle, or the minimum elevation angle may be set in advance as a fixed parameter for a satellite service.

Next, the antenna orientation deciding unit 38 calculates a probability density function for the azimuthal angle of the mobile relay station 2 during satellite visible time that satisfies the elevation angle not less than the minimum elevation angle, for all passes of the mobile relay station 2 (step S304). All passes of the mobile relay station 2 means the orbit of the mobile relay station 2 around the Earth. All passes of the mobile relay station 2 represents the travel pattern of the mobile relay station 2 when viewing the mobile relay station 2 from the ground, as viewed from the terminal station 3. In a case in which the mobile relay station 2 has an orbit that has a cyclicity, in which the positional relation between the mobile relay station 2 and the Earth eventually returns to the original state, the orbit in which the mobile relay station 2 circles around the Earth once is "one pass".

Figure 7:
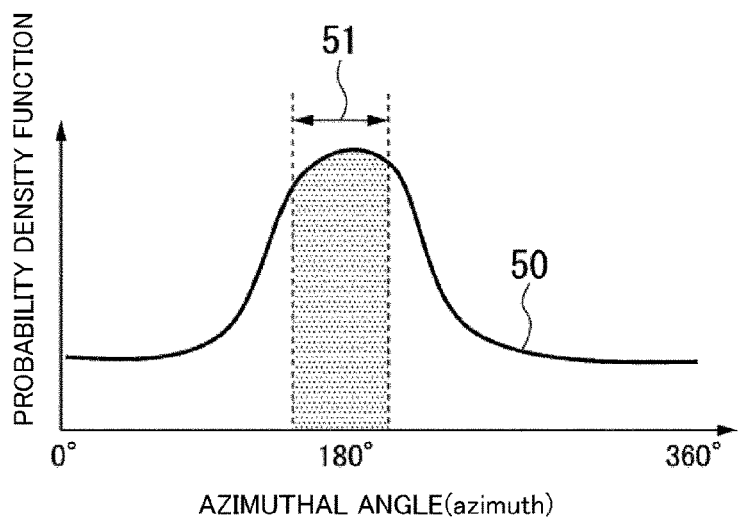
FIG. 7 is a diagram representing a relation between an azimuthal angle and a probability density function in the third embodiment.

The antenna orientation deciding unit 38 obtains a distribution 50 shown in FIG. 7, on the basis of the probability density function of the azimuthal angle of the mobile relay station 2. The horizontal axis in FIG. 7 represents the azimuthal angle, and the vertical axis represents the probability density function. The antenna orientation deciding unit 38 calculates an integral value of sections included in a half-bandwidth 51 of the antenna 33 of the terminal station 3*b*, based on the distribution 50 and the half-bandwidth 51, for each azimuthal angle (step S305). The half-bandwidth 51 of the antenna 33 is measured in advance. The antenna orientation deciding unit 38 is assumed to hold information of the half-bandwidth 51 of the antenna 33 in advance.

As specific processing, the antenna orientation deciding unit 38 takes a certain azimuthal angle as a central angle, and calculates an integral value of sections included in the half-bandwidth 51, centered on the position of this central angle, for each azimuthal angle. For example, in a case in which the central angle is 180°, the antenna orientation deciding unit 38 calculates the integral value of sections included in the half-bandwidth 51 centered on the 180° position. The antenna orientation deciding unit 38 calculates this processing while changing the central angle over a range of azimuthal angles of 0° to 360°. It is sufficient for the increment of changing the central angle to be set in advance. For example, the increment of changing the central angle may be 1°. In a case in which the increment of changing the central angle is 1°, the antenna orientation deciding unit 38 calculates 360 integral values.

The antenna orientation deciding unit 38 decides the central angle at which the integral value is the greatest out of the calculated integral values as being the optimal orientation (step S306). That is to say, in a case in which the central angle at which the integral value is the greatest is 180°, the antenna orientation deciding unit 38 decides the orientation of 180° to be the optimal orientation. The antenna orientation deciding unit 38 outputs information relating to the optimal orientation that has been decided to the information output unit 39 as antenna orientation information.

The information output unit 39 outputs the antenna orientation information output from the antenna orientation deciding unit 38 (step S307). For example, the information output unit 39 transmits the antenna orientation information to an external device. In a case in which the terminal station 3*b* is provided with a display device, for example, the information output unit 39 displays the antenna orientation information on the display device.

According to the wireless communication system 1*b* configured as described above, the direction at which the gain of the antenna 33 is greatest can be decided before installing the terminal station 3*b*. Thus, communication quality can be improved in actual communication. Accordingly, even inexpensive terminals can efficiently perform communication with the mobile relay station 2.

Modification of Third Embodiment

In the above embodiment, although a configuration has been described in which a probability density function of the azimuthal angle of the mobile relay station 2 during satellite visible time that satisfies the elevation angle not less than the minimum elevation angle is calculated, a probability density function of the azimuthal angle of the mobile relay station 2 during satellite visible time that exceeds minimum reception power may be used. In this case as well, the antenna orientation deciding unit 38 calculates the integral value for each azimuthal angle, in the same way as in the above embodiment.

The antenna orientation deciding unit 38 may decide an orientation obtained on the basis of an azimuthal angle at which the probability density function of azimuthal angles is greatest to be the optimal orientation.

The antenna orientation deciding unit 38 may decide an orientation at which greatest power can be received, even for an instant, to be the optimal orientation, instead of using the probability density function.

The processing of the antenna control units 34 and 34*a*, the antenna orientation deciding unit 38, and the information output unit 39 in the above-described embodiments may be realized by a computer. In this case, these may be realized by recording a program for realizing these functions in a computer-readable recording medium, and causing a computer system to read and execute the program recorded in this recording medium. Note that "computer system" as used here includes an OS and hardware such as peripheral equipment and so forth. Also, "computer-readable recording medium" refers portable media such as flexible disks, magneto-optical discs, ROM, CD-ROM, and so forth, and storage devices such as hard disks or the like built into the computer system.

Further, "computer-readable recording medium" may include arrangements that dynamically hold the program for a short period of time, such as a network such as the Internet or the like, or a communication wire in a case of transmitting the program over a communication line such as a telephone line or the like, or an arrangement in which the program is held for a certain amount of time, as with volatile memory within the computer system serving as a server or a client in this case. Also, the above program may be for realizing part of the above-described functions, and further the above-described functions may be realized by combination with a program already recorded in the computer system, and may be realized using a programmable logic device such as an FPGA (Field Programmable Gate Array) or the like.

Although embodiments of this invention have been described above in detail with reference to the Figures, specific configurations are not limited to these embodiments, and designs and so forth of a scope not departing from the essence of this invention are also included.

INDUSTRIAL APPLICABILITY

The present invention can be applied to technology of performing communication with a moving body in which a mobile relay station is installed.

REFERENCE SIGNS LIST 1, 1a, 1b Wireless communication system
2 Mobile relay station
3, 3a, 3b Terminal station
4 Base station
21 Antenna
22 Terminal communication unit
23 Data storage unit
24 Base station communication unit
25 Antenna
31, 31a, 31b Storage unit
32 Transmission unit
33 Antenna
34, 34a Antenna control unit (antenna orientation deciding unit)
35 Sensor
36 Position information acquisition unit
37 Azimuth information acquisition unit
38 Antenna orientation deciding unit
39 Information output unit
41 Antenna
42 Reception unit
43 Base station signal reception processing unit
44 Terminal signal reception processing unit
221 Reception unit
222 Received waveform recording unit
241 Storage unit
242 Control unit
243 Transmission data modulation unit
244 Transmission unit

The invention claimed is:

1. An antenna orientation deciding method in a wireless communication system that has a communication device provided with an antenna having directionality and a relay device that travels, the antenna orientation deciding method comprising:
the communication device has an installation mode for determining a direction of the antenna during installation of the communication device and a transmission mode for data transmission,
in the installation mode, deciding an orientation at which the directionality of the antenna as to the relay device is optimal at a position before the installation of the communication device, on the basis of position information of the communication device, orbit information of the relay device, and information relating to orientation of directionality of the antenna, and
in the transmission mode, deciding an orientation at which the directionality of the antenna as to the relay device is optimal, on the basis of position information of the communication device, orbit information of the relay device, and information relating to orientation of directionality of the antenna.

2. The antenna orientation deciding method according to claim 1, wherein
the communication device includes a plurality of the antennas,
each of the plurality of antennas has directionality in a different orientation from each other, and
in the deciding, a position of the relay device is estimated on the basis of orbit information of the relay device, and an orientation of the antenna having directionality in the orientation of the estimated position of the relay device, out of orientations decided using the position information of the communication device and information relating to orientation of directionality of the antennas, is decided to be the orientation at which the directionality of the antenna as to the relay device is optimal.

3. The antenna orientation deciding method according to claim 1, wherein
the communication device is installed at a location subjected to effects of rocking,
the antenna orientation deciding method further comprising:
acquiring movement information of the communication device, wherein
in the deciding, a position of the relay device is estimated on the basis of orbit information of the relay device, and in a case in which the orientation of directionality of the antenna estimated using the movement information and the position information is facing an orientation of the estimated position of the relay device, the orientation of directionality of the antenna is decided to be the orientation at which the directionality of the antenna as to the relay device is optimal.

4. The antenna orientation deciding method according to claim 1, further comprising:
acquiring azimuth information relating to the orientation of directionality of the antenna, wherein
in the deciding, a probability density function of an azimuthal angle of the relay device that satisfies a predetermined condition is calculated on the basis of orbit information of the relay device, the position information, and the azimuth information, and a direction obtained on the basis of an azimuthal angle at which the probability density function of the calculated azimuthal angle is greatest or a direction obtained on the basis of an azimuthal angle at which a section integration of half-bandwidth of the antenna in the probability density function of the azimuthal angle is greatest, or a direction at which maximum power can be received, is decided to be the orientation at which the directionality of the antenna as to the relay device is optimal.

5. A wireless communication system that has a communication device provided with an antenna having directionality and a relay device that travels, the wireless communication system comprising:
the communication device has an installation mode for determining a direction of the antenna during installation of the communication device and a transmission mode for data transmission,
an antenna orientation decider configured to:
decide, in the installation mode, an orientation at which the directionality of the antenna as to the relay device is optimal at a position before the installation of the communication device, on the basis of position information of the communication device, orbit information of the relay device, and information relating to orientation of directionality of the antenna, and
decide, in the transmission mode, an orientation at which the directionality of the antenna as to the relay device is optimal, on the basis of position information of the communication device, orbit information of the relay device, and information relating to orientation of directionality of the antenna.

6. A communication device in a wireless communication system that has the communication device provided with an antenna having directionality and a relay device that travels, the communication device comprising:

the communication device has an installation mode for determining a direction of the antenna during installation of the communication device and a transmission mode for data transmission, an antenna orientation decider configured to:

decide, in the installation mode, an orientation at which the directionality of the antenna as to the relay device is optimal at a position before the installation of the communication device, on the basis of position information of the communication device, orbit information of the relay device, and information relating to orientation of directionality of the antenna, and decide, in the transmission mode, an orientation at which the directionality of the antenna as to the relay device is optimal, on the basis of position information of the communication device, orbit information of the relay device, and information relating to orientation of directionality of the antenna.

* * * * *